United States Patent [19]

Klingmann et al.

[11] Patent Number: 5,207,197
[45] Date of Patent: May 4, 1993

[54] CYLINDER HEAD FOR A MULTI-CYLINDER INTERNAL COMBUSTION ENGINE

[75] Inventors: Rolf Klingmann, Plüderhausen; Christoph Spengel, Stuttgart, both of Fed. Rep. of Germany

[73] Assignee: Mercedes-Benz AG, Fed. Rep. of Germany

[21] Appl. No.: 888,118

[22] Filed: May 26, 1992

[30] Foreign Application Priority Data

May 24, 1991 [DE] Fed. Rep. of Germany ....... 4116944

[51] Int. Cl.$^5$ ............................................... F02F 7/00
[52] U.S. Cl. .............................. 123/195 R; 123/90.27
[58] Field of Search ......................... 123/90.27, 195 R

[56] References Cited

U.S. PATENT DOCUMENTS

| | | | |
|---|---|---|---|
| 3,087,473 | 4/1963 | Thompson et al. | 123/41.84 |
| 4,615,309 | 10/1986 | Yoshikawa | 123/90.27 |
| 4,721,074 | 1/1988 | Wirth et al. | 123/90.27 |

FOREIGN PATENT DOCUMENTS

| | | |
|---|---|---|
| 3009302 | 9/1980 | Fed. Rep. of Germany . |
| 3940845 | 8/1990 | Fed. Rep. of Germany . |
| 1151619 | 5/1969 | United Kingdom . |

OTHER PUBLICATIONS

The M 635 CSi—A High-Performance Car from BMW, Rainer Bratenstein and Horst Rech, ATZ, 1983, pp. 531–532 and 535–536.

*Primary Examiner*—Noah P. Kamen
*Attorney, Agent, or Firm*—Evenson, McKeown, Edwards & Lenahan

[57] ABSTRACT

A cylinder head for a multi-cylinder internal combustion engine with a cylinder head block which bounds a cooling water space, is closed at the top by a cylinder head cover plate and has tubular chambers extending in the direction of the cylinder axis to accommodate a spark plug, an injection nozzle or an injection nozzle with precombustion chamber. A camshaft space is located above the cover plate with devices for valve control, and a bearing pedestal to accommodate at least one camshaft is provided in the camshaft space. The bearing locations for the camshaft are covered by bearing covers. In order to reduce the manufacturing requirements and, furthermore, to minimize the noise radiation caused by the cylinder head side walls, a split plane formed between the cylinder head block and the bearing pedestal extends at the level of the upper chamber edge.

1 Claim, 3 Drawing Sheets

CYLINDER HEAD FOR A MULTI-CYLINDER INTERNAL COMBUSTION ENGINE

BACKGROUND AND SUMMARY OF THE INVENTION

The invention relates to a cylinder head for multi-cylinder internal combustion engine, and more particularly, to a cylinder head with a cylinder head block bounding a cooling water space, and closed at the top by a cylinder head cover plate. The block has tubular chambers extending in the direction of the cylinder axis to accommodate a spark plug and injection nozzle or an injection nozzle with precombustion chamber. A camshaft space is located above the cover plate with devices for valve control. A bearing pedestal to accommodate at least one camshaft and separate from the cylinder head block is provided in the camshaft space, and the bearing locations for the camshaft are covered by bearing covers.

DE-PS 39 40 845 shows a cylinder head consisting of a cylinder head block and, placed thereon, a bearing pedestal for accommodating camshafts and the associated bearing covers. The bearing pedestal is carried on a flange formed by the side and end walls of the cylinder head block and on a support column located between the individual cylinder sections in the central longitudinal plane of the cylinder head. The flange formed by the upper termination of the side and end walls simultaneously acts as the support for a rocker cover which closes off the camshaft space. A tubular chamber extending in the direction of the cylinder axis is provided in the cylinder head block to accommodate a spark plug or an injection nozzle which emerges into the camshaft space above the cylinder head cover plate.

A disadvantage of the configuration of the split plane between the cylinder head block and the bearing pedestal at the level of the upper termination of the cylinder head side walls and cylinder head end walls above the termination of the tubular chamber is that, during the manufacture of the cylinder head block, the surfaces of the split plane and the termination of the chamber have to be machined in separate operations. This fact lengthens the machining time and makes manufacture more expensive.

A further disadvantage in the known cylinder head arrangement resides in the fact that, because the bearing pedestal is carried on the side and end walls, the walls extending between the bearing pedestal and the cylinder head cover are excited to vibration and therefore increase the noise radiated from the internal combustion engine.

An object of the present invention is, therefore, to provide a cylinder head which reduces the manufacturing requirements. A further object of the present invention is to minimize the noise radiation caused by the cylinder head side walls.

These objects have been achieved in accordance with the present invention, by forming a split plane between the cylinder head block and the bearing pedestal, with the split plane extending at the level of the upper edge of the chamber.

On the basis of the known cylinder head for a multi-cylinder internal combustion engine with tubular chambers extending in the direction of the cylinder axis in the cylinder head block, the bearing pedestal located in the camshaft space above the cover plate of the cylinder head block is placed, according to the present invention, such that the split plane between the cylinder head block and the bearing pedestal extends at the level of the upper edge of the tubular chamber. This ensures that all the support surfaces on the bottom of the bearing pedestal and all the corresponding support surfaces in the cylinder head block are located in one plane and can therefore be machined in one operation. Reclamping of the parts or movement of the tool into a different plane becomes unnecessary. The manufacturing requirements are thus reduced and the machining time shortened. Because of the movement of the split plane, as described, vibrations caused by the cam drive are introduced directly into the cylinder head block and no longer via the cylinder head end walls and cylinder head side walls. The noise radiation emerging from these walls is reduced.

In one currently preferred embodiment of the present invention, the cylinder head end walls and cylinder head side walls extend beyond the above-mentioned split plane as far as a plane underneath the split plane formed between the bearing pedestal and the bearing covers. Because the bearing cover split plane is located above the side walls, machining of the bearing bores for the camshafts can be undertaken with the bearing pedestal fitted.

BRIEF DESCRIPTION OF THE DRAWINGS

These and further objects, features and advantages of the present invention will become more apparent from the following detailed description of a currently preferred embodiment when taken in conjunction with the accompanying drawings wherein.

DETAILED DESCRIPTION OF THE DRAWINGS

Figure 1:
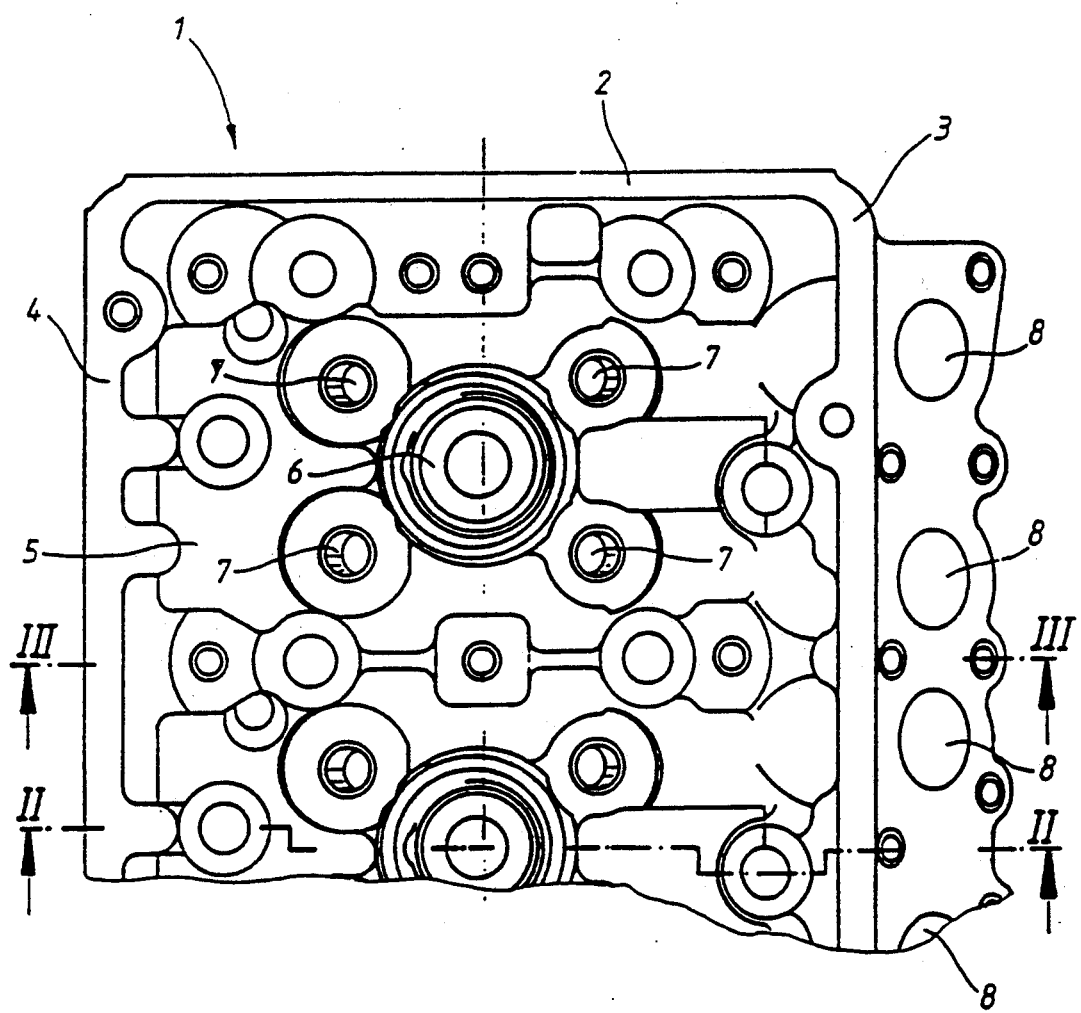
FIG. 1 is a plan view of a part of a cylinder head.

A portion of the cylinder head 1 shown in FIG. 1 has a camshaft space 5 bounded by end wall 2 and side walls 3 and 4. The cylinder head 1 is a four-valve cylinder head with a central chamber 6 for accommodating an injection nozzle, a precombustion chamber or a sparking plug, around which are located four guide holes 7 for accommodating the valve stems. The inlet ducts to the cylinders are designated by numeral 8.

Figure 2:
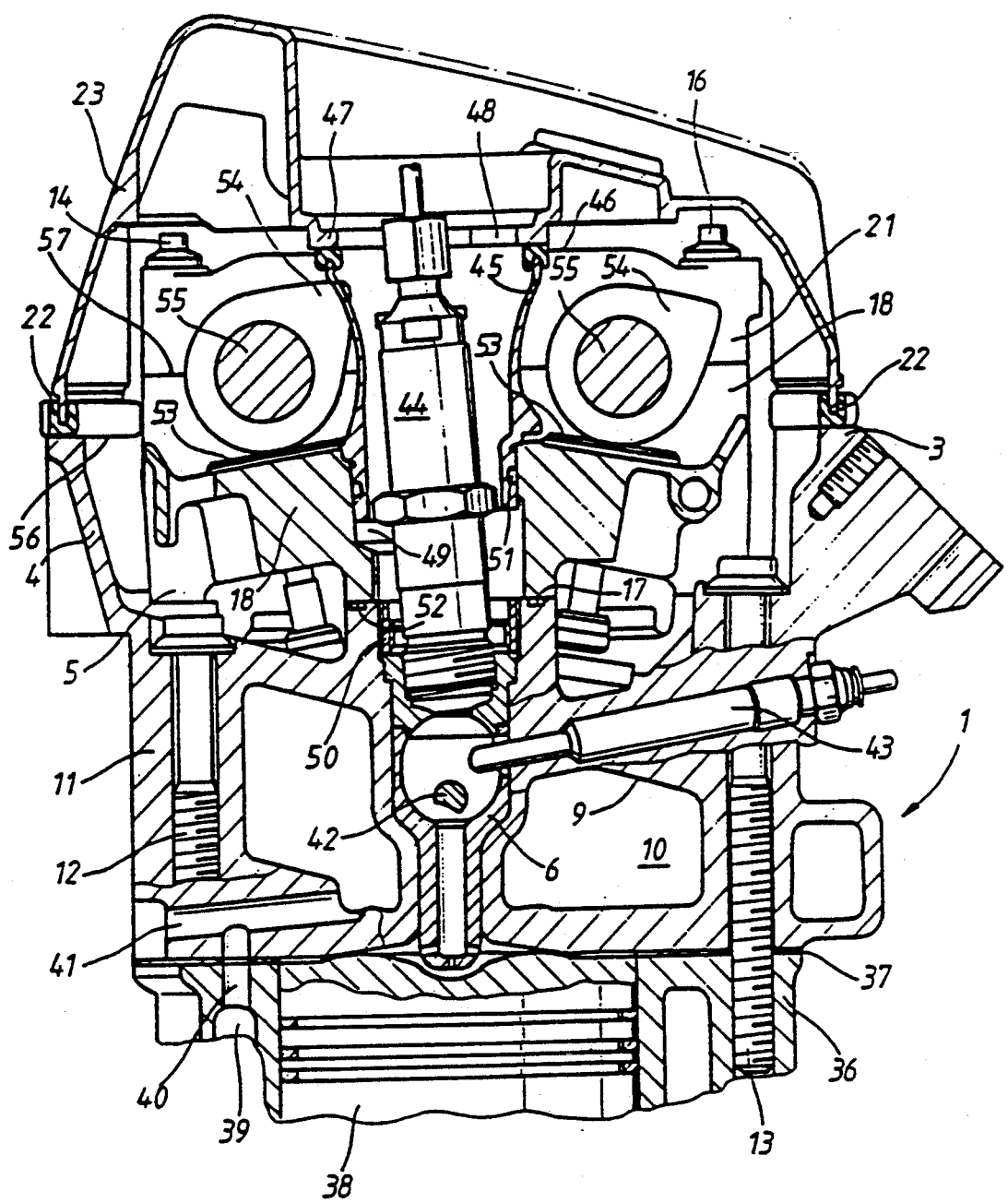
FIG. 2 is a sectional view through the cylinder head level with the camshaft bearing along a line II—II of FIG. 1.

The cylinder head 1 shown in FIG. 2 is a cross-section through the center of the cylinder. Similar parts in this figure as those used in FIG. 1 have the same reference numerals. The cylinder head 1 has a cooling water space 10 closed off by a cylinder head cover plate 9 and has the previously mentioned camshaft space 5 located above the cover plate and bounded by the walls 3, 4. The cylinder head block 11 is releasably connected to a cylinder block and crankcase 36 by bolted connections 12, 13. A camshaft bearing pedestal 18 is placed on the cylinder head block 11 at a split plane 17 and is connected thereto by way of bolted connections 14, 16. Two camshafts 55 with cams 54 rest in bearing shells (not shown) of the bearing pedestal 18, and these camshafts 55 are held by bearing covers 21 which are also connected by bolted connections 14 to 16 to the bearing pedestal 18 and, therefore, to the cylinder head block 11. The cylinder head 1 with the camshaft space 5 is closed off from the outside by a rocker cover 23 in contact therewith via seals 22.

A cylinder head seal 37 and a piston 38 are arranged in the cylinder block and crankcase 36. A hole 40 leads from the cooling water jacket 39 of the cylinder block and crankcase into a cooling water guide 41 to the cooling water space 10 of the cylinder head block 11. The central chamber 6 is inserted in the center of the cylinder in a hole 49 in the bearing pedestal 18 and is held by a fastening member 50. The chamber 6 is accommodated as the precombustion chamber with an impingement rod 42, with a glow plug 43 protruding into the chamber 6 and an injection nozzle 44 being screwed thereonto.

The injection nozzle 44 is separated from the camshaft space 5 by a sleeve 45 which carries, at its upper end, a U-shaped seal 46 which is pressed against a collar 47 of the rocker cover 23. Thereby, the opening 48 for the injection nozzle at the side is sealed and separates the fuel space from the oil space. The lower end of the sleeve 45 is sealed by an O-ring 51 against the camshaft bearing pedestal 18 which, in turn, separates the oil space from the fuel space at the split plane 17 via a seal 52.

The camshaft bearing pedestal 18 acts simultaneously as the carrier for the bucket tappets 53 which, actuated by the cams 54 of the camshaft 55, actuate the engine valves. The split plane 17 between the cylinder head block 11 and the bearing pedestal 18 extends at the level of the upper chamber edge formed by the fastening member 50.

Figure 3:
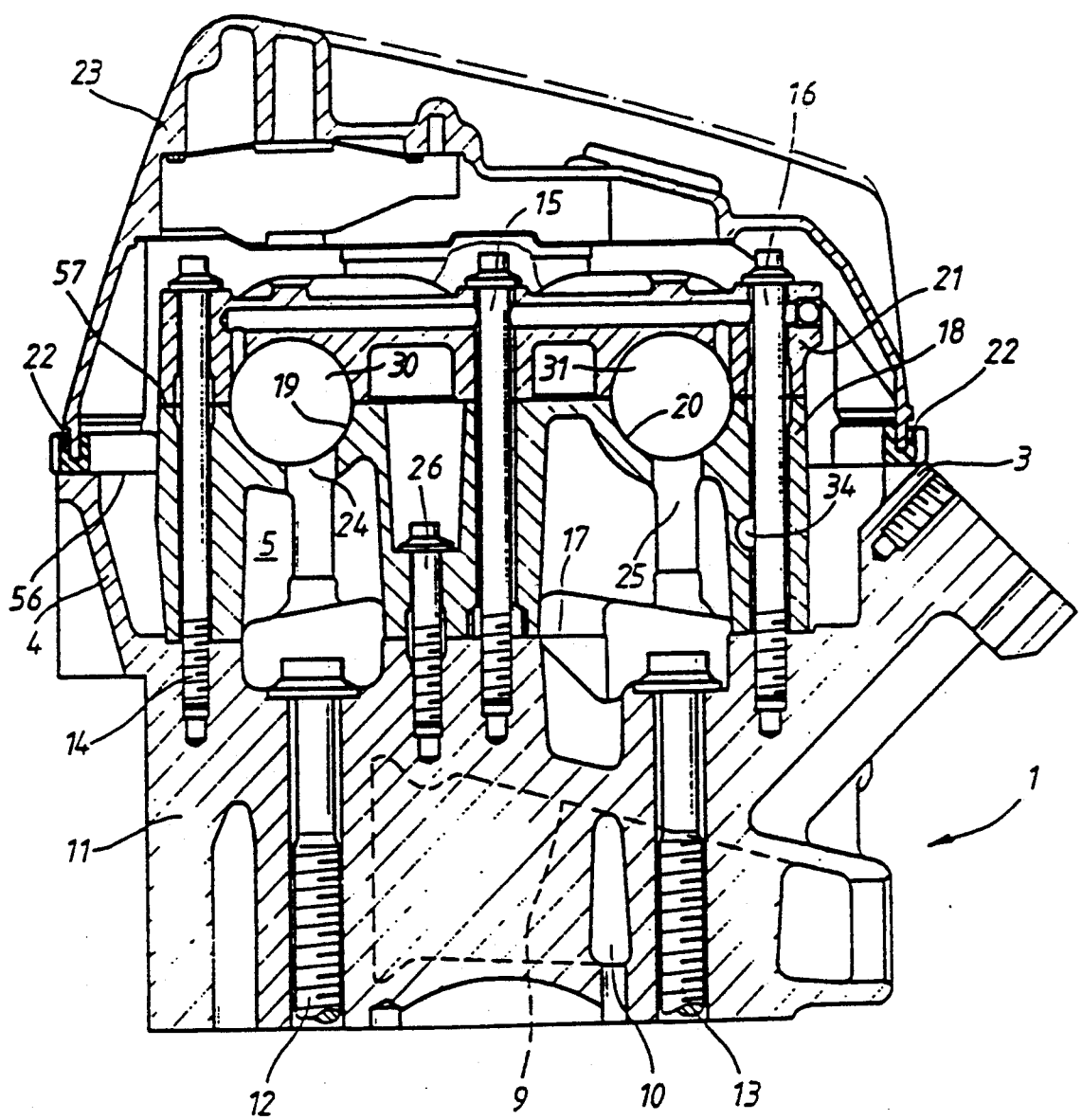
FIG. 3 is a further sectional view through the cylinder head along line III—III of FIG. 1.

The cross-sectional view through such the cylinder head 1 level with the camshaft bearing depicted in FIG. 3 shows that the cylinder head 1 has a cooling water space 10 closed by a cylinder head cover plate 9 (shown in dotted lines) and the camshaft space 5 located above the cover plate 9 and bounded by the walls 3 and 4. The cylinder head block 11 is releasably connected to the cylinder block and crankcase (not shown) by the bolted connections 12, 13. The camshaft bearing pedestal 18 is placed on the cylinder head block 11 at the split plane 17 and is connected thereto by the further bolted connections 14, 15 and 16.

Two camshafts (not shown) rest in the camshaft bearings 30, 31 with the bearing shells 19, 20 of the bearing pedestal 18 and are held by bearing covers 21, which are also connected by the bolted connections 14 to 16 to the bearing pedestal 18 and, therefore, to the cylinder head block 11. The cylinder head 1 with the camshaft space 5 is, as described above, closed off from the outside by a rocker cover 23 in contact therewith via seals 22. The bearing shells 19, 20 can be provided with openings 24, 25 in order to permit simple dismantling of the cylinder head 1, even when the bearing pedestal 18 is placed in position, by releasing the bolted connections 12, 13. When the bearing covers 21 have been removed, the camshaft bearing pedestal 18 is fixed in its position by the bolt 26.

The position of the split plane 17 can also be clearly seen in FIG. 3 and extends at the same height as already described. Because of this position, all the contact surfaces of the bearing pedestal 18 on the cylinder head block 11, i.e. both the surfaces underneath the camshaft bearing and the contact surfaces in the center of the cylinder around the tubular chamber 6, are located in one plane and their surface can thereby be simply machined in one operation and with one clamping. The machining time can, therefore, be reduced.

It may be seen from FIGS. 2 and 3 that the side walls 3, 4 of the cylinder head block (the same also applies to the two end walls which are not visible) extend beyond the split plane 17 between the cylinder head block 11 and the bearing pedestal 18 and, in fact, as far as a plane 56 which, in turn, extends underneath the split plane 57 located between the bearing pedestal 18 and the bearing covers 21. This position of the plane 56, because of which the split plane 57 protrudes upwards, makes it possible to machine the bearing bores for the camshafts 19, 20 with the bearing pedestal 18 already fitted to the cylinder head block 11.

The side walls 3, 4 and the end walls 2 of the cylinder head block 11 protrude freely above the split plane 17 and are not used as contact surfaces for the bearing pedestal 18 and, furthermore, have no direct connection to the bearing pedestal 18. Consequently, the cam drive can no longer excite these walls 2, 3, 4 to vibration so that the noise radiation from these walls is substantially reduced.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A cylinder head for a multi-cylinder internal-combustion engine, comprising a cylinder head block having therein a cooling water space, a bearing pedestal operatively arranged at said cylinder head block, and a cylinder head cover plate closing the cylinder head block toward a top thereof, said cylinder head block having tubular chambers extending in a direction of the cylinder axis to accommodate a spark plug in each of said chambers, wherein a split plane is formed between said cylinder head block and said bearing pedestal, the split plane extending at a level of an upper edge of said chamber, side and end walls bounding aid cylinder head block extend beyond the split plane as far as to a plane underneath a second split plane formed between said bearing pedestal and a bearing cover operatively arranged with respect to said bearing pedestal, and screws operatively fasten said bearing pedestal, together with said bearing covers associated with each two camshafts to said cylinder head block.

* * * * *